Figure 7:
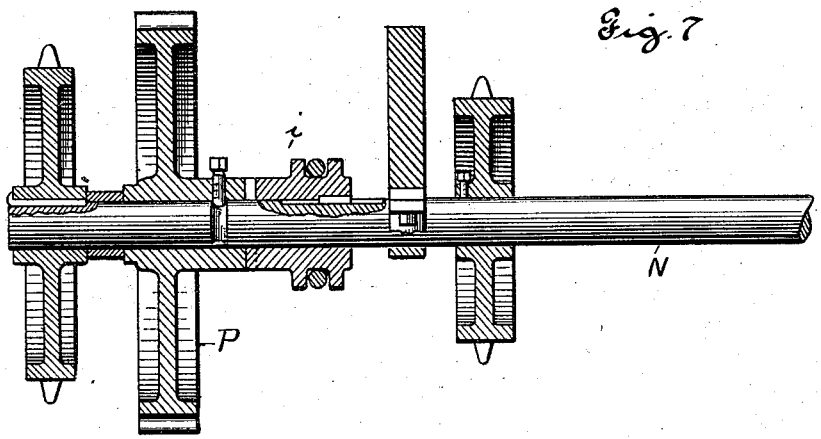
Figure 8:
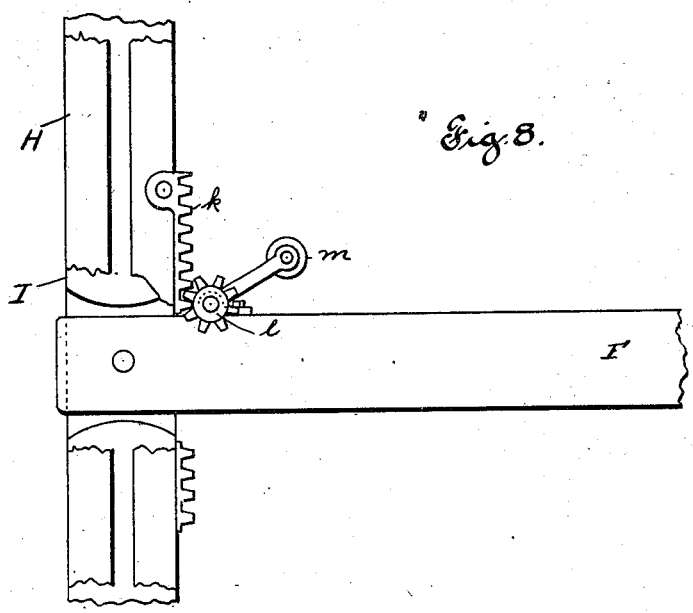

No. 723,753. PATENTED MAR. 24, 1903.
J. J. SULLIVAN.
CLAY MIXER AND CARRIER.
APPLICATION FILED JULY 29, 1902.
NO MODEL. 4 SHEETS—SHEET 1.
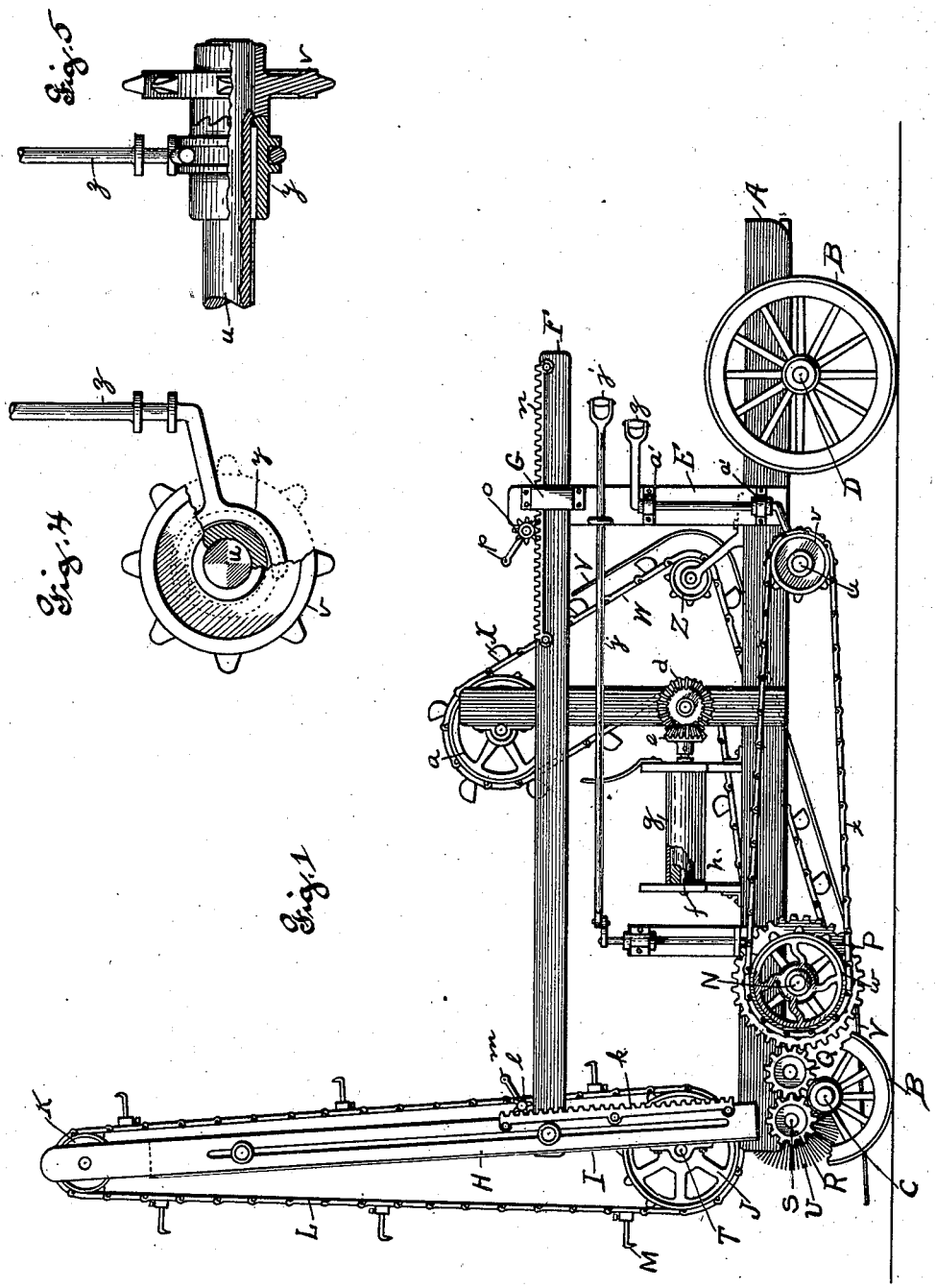

No. 723,753. PATENTED MAR. 24, 1903.
J. J. SULLIVAN.
CLAY MIXER AND CARRIER.
APPLICATION FILED JULY 29, 1902.
NO MODEL. 4 SHEETS—SHEET 2.
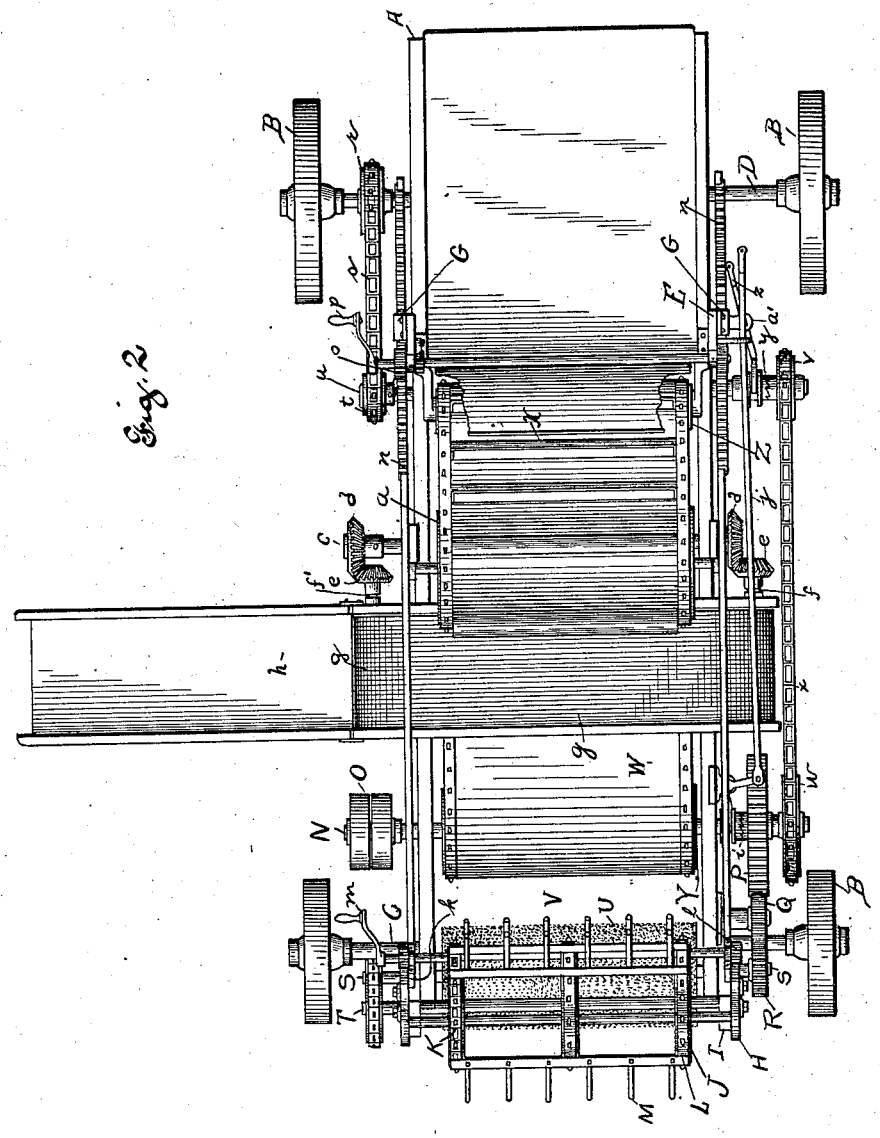

No. 723,753. PATENTED MAR. 24, 1903.
J. J. SULLIVAN.
CLAY MIXER AND CARRIER.
APPLICATION FILED JULY 29, 1902.
NO MODEL. 4 SHEETS—SHEET 3.
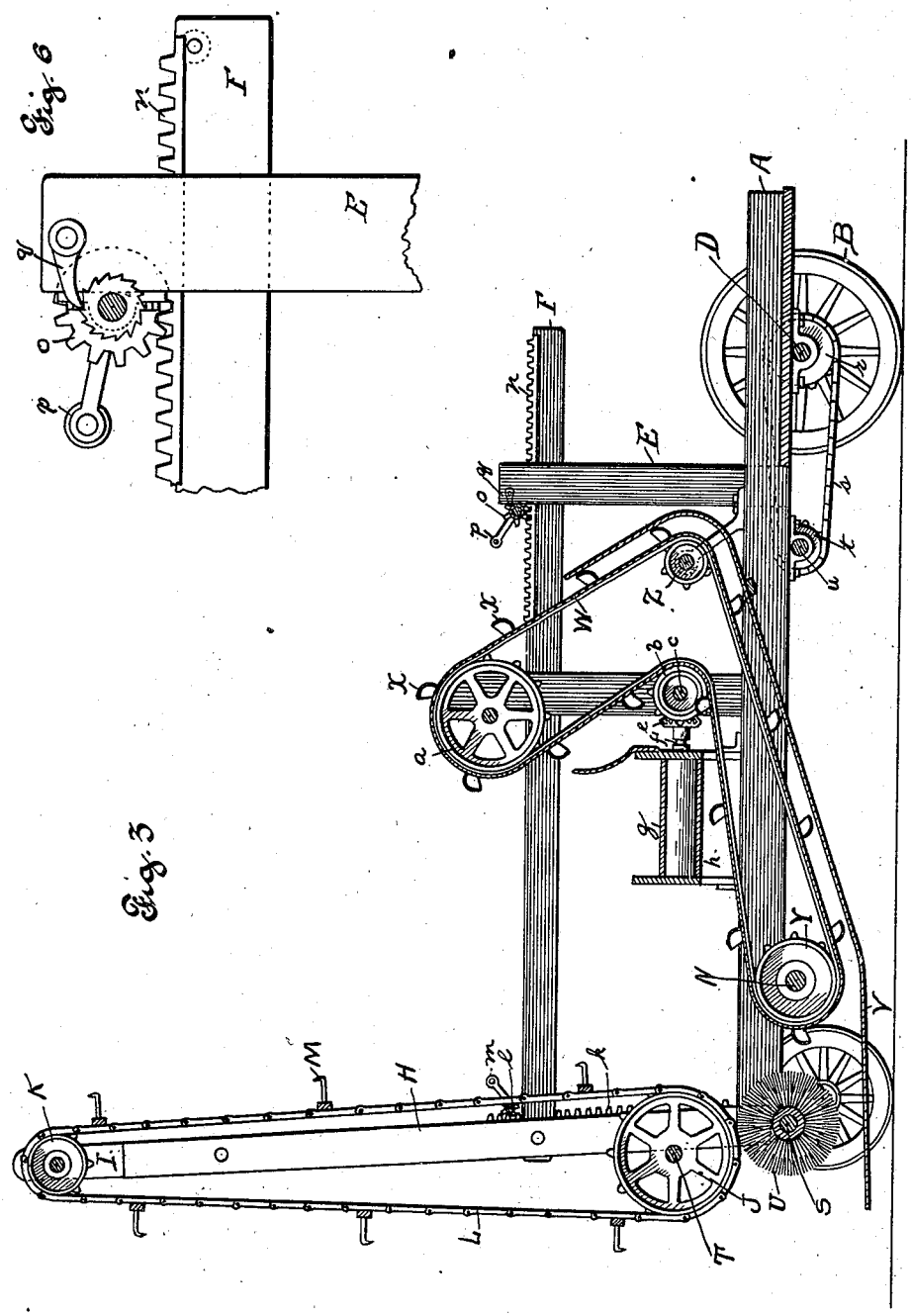
Witnesses
Inventor
James J. Sullivan No. 723,753. PATENTED MAR. 24, 1903.
J. J. SULLIVAN.
CLAY MIXER AND CARRIER.
APPLICATION FILED JULY 29, 1902.
NO MODEL. 4 SHEETS—SHEET 4.

Witnesses
Alfred O. Eicker
M. Adrion

Inventor
James J. Sullivan
by Higdon & Longan attys

UNITED STATES PATENT OFFICE.

JAMES JOSEPH SULLIVAN, OF FERGUSON, MISSOURI.

CLAY MIXER AND CARRIER.

SPECIFICATION forming part of Letters Patent No. 723,753, dated March 24, 1903.

Application filed July 29, 1902. Serial No. 117,474. (No model.)

*To all whom it may concern:*

Be it known that I, JAMES JOSEPH SULLIVAN, of the city of Ferguson, St. Louis county, State of Missouri, have invented certain new and useful Improvements in Clay Mixers and Carriers, of which the following is a full, clear, and exact description, reference being had to the accompanying drawings, forming a part hereof.

My invention relates to certain improvements in clay mixers and carriers.

It consists in certain details of construction, which will be more fully described by reference to the accompanying drawings, in which—

Figure 1 is a side view of the clay mixer and carrier. Fig. 2 is a top view of the same. Fig. 3 is a longitudinal sectional view of the same. Figs. 4, 5, 6, 7, and 8 are details of construction.

My invention is applicable to mixing and carrying of clay when the same has been banked at any desired location.

The framework of my machine consists of sills A, mounted upon wheels B, the front wheels being carried by the axle C and the rear wheels being mounted on and driven by the rigid axle D. The vertical supports E are mounted upon and carried by the sills A and in turn assist in carrying the bearer F by means of the support G. The vertical members H are slidably mounted upon the forward extremities of the bearers F, to which the vertical members I are pivotally connected, and the members I are also attached to the forward ends of the sills A. The members H overlap and are slidably mounted upon the members I. The sprockets J are mounted upon the members I. The sprockets K are mounted upon the members H, and the endless chain L, carrying pickers M, is operated by sprockets J and K.

When the machine is in position before a bank of clay, the sprockets J and K are operated by the jack-shaft N, which is revolved by the application of any suitable power generated from a point on the machine or attached thereto and applied to the pulley O. The power primarily applied to the jack-shaft N is conveyed through the gear-wheels P, Q, and R to the shaft T, so causing the revolution of the sprocket-wheels J and K and the endless chain L. The shaft S also carries the brush U, which receives and brushes the clay fed to it by the pickers M. The clay is then received upon the table V, from whence it is conveyed by the carrying-belt W and its buckets X. The belt W is actuated by the drum Y, mounted upon the jack-shaft N, and passes around the drums Z, $a$, and $b$, the drum $b$ being mounted on the shaft $c$, which has at its extremities the beveled cogs $d$, which are geared with the beveled cogs $e$ to impart motion to the shafts $f$ and $f'$, upon which the carrying-belt $g$ is mounted. The clay carried by the belt W and buckets X is discharged upon the carrying-belt $g$ and carried by it to the discharge-spout $h$.

The movement of the sprockets J and K is controlled by means of the clutch $i$, as shown in Fig. 7, which is controlled by the lever $j$ and its connections.

The supporting members H are vertically adjustable by means of the rack $k$ and pinion $l$, operated by the crank $m$, and the entire structure carrying the endless chain L is adjustable axially about its pivotal connection to the sills A by means of the rack $n$ and pinion $o$, operated by the lever $p$ and held in place by the ratchet $q$, as shown in Fig. 6.

When it is desired to change the position of the entire machine, movement is imparted to the rear wheels B through the shaft D by means of the gear-wheel $r$, through the chain $s$, connecting with the gear-wheel $t$ on the shaft $u$. The shaft $u$ terminates at its opposite end in the gear-wheel $v$, connected with the gear-wheel $w$ on the shaft N by the chain $x$, the movement of the shaft $u$ being controlled by the clutch $y$, as shown in Fig. 5, and which is controlled by the crank-bar $z$, pivoted to the upright E by means of the hinges $a'$.

Having thus described my invention, what I claim as new, and desire to secure by Letters Patent, is—

1. A clay mixer and carrier comprising adjustably-mounted pickers, a brush receiving the clay from the pickers, a receiving-platform, carrier-belts conveying the clay from the receiving-platform, and a discharge-trough, substantially as and for the purposes specified.

2. A clay mixer and carrier comprising a framework mounted on wheels, adjustably-mounted pickers, a brush mounted beneath the pickers and adapted to receive the discharge therefrom, and conveyers by which the clay is carried to a discharge-trough substantially as described.

3. In a clay mixer and carrier the combination of a framework portably mounted, an endless chain bearing pickers and adjustably mounted on the framework, a revolving brush adapted to receive the discharge from the pickers, a receptacle mounted beneath the brush, a belt provided with cups and adapted to convey the clay from the receptacle to a discharge-belt, a second discharge-belt adapted to receive the clay and deliver it to a discharge-pipe, substantially as and for the purposes set forth.

4. The combination in a machine for mixing and carrying clay of the character described, of a machine-frame, wheels supporting and capable of propelling the frame, an endless chain provided with pickers, a brush through which the clay passes from the pickers, a receiving-platform and a series of conveyer-belts whereby the clay is conveyed from the receiving-platform, and a discharge-trough, substantially as described.

5. The combination in a machine for mixing and carrying clay of the following instrumentalities, viz: a series of pickers operating in a plane approximately vertical, a brush to receive and assist in mixing the clay delivered by the pickers, a platform to receive the clay from the brush, a carrying-belt provided with buckets whereby the clay is elevated from the platform, a discharge-belt and a discharge-trough, a jack-shaft communicating power to the machine, combined with a clutch whereby the whole machine is propelled, substantially as described.

6. In a clay mixer and carrier, a vertically-operating endless chain carrying pickers and mounted upon sprockets held by vertical bearers, the bearers being slidably adjustable upon themselves and pivotally adjustable upon the bed of the machine, a rack and pinion to control and effect such pivotal adjustment, and a clutch whereby the operation of the endless chain may be begun or ended during the operation of the other parts of the machine, substantially as described.

7. In a clay mixer and carrier, a frame, a jack-shaft adapted to receive and distribute power for the operation of the entire machine, a shaft bearing a brush and having a gear-and-clutch connection with the jack-shaft, an endless chain provided with pickers and mounted in a vertical plane upon bearers carrying sprockets, the bearers being pivoted to the end of the frame, a gear connection between the sprockets and the shaft bearing the brush, a rack and pinion adapted to adjust the bearers carrying the chain and pickers longitudinally, a rack and pinion adapted to adjust the bearers carrying the chain and pickers pivotally about the end of the frame, a receiving-platform, a belt provided with buckets and mounted upon the jack-shaft and adapted to receive the discharge from the receiving-platform, a transverse carrying-belt adapted to receive and convey transversely the discharge from the buckets, a discharge-trough, supporting-wheels, one set whereof are rigidly attached to a shaft, and a gear-and-clutch connection between the shaft and the jack-shaft whereby the wheels may be propelled, substantially as and for the purposes set forth.

In testimony whereof I affix my signature in presence of two witnesses.

JAMES JOSEPH SULLIVAN.

Witnesses:
 M. G. IRION,
 JOHN C. HIGDON.